US010620776B2

(12) United States Patent
Posner et al.

(10) Patent No.: US 10,620,776 B2
(45) Date of Patent: Apr. 14, 2020

(54) SYSTEM TO PRESENT ADDITIONAL ITEM INFORMATION

(71) Applicant: eBay Inc., San Jose, CA (US)

(72) Inventors: Nicholas David Posner, San Carlos, CA (US); Randall Scott Shoup, San Francisco, CA (US); Sriram Samu, San Jose, CA (US); Thomas Lo, San Carlos, CA (US)

(73) Assignee: eBay Inc., San Jose, CA (US)

( * ) Notice: Subject to any disclaimer, the term of this patent is extended or adjusted under 35 U.S.C. 154(b) by 526 days.

(21) Appl. No.: 14/611,220

(22) Filed: Jan. 31, 2015

(65) Prior Publication Data

US 2015/0199103 A1 Jul. 16, 2015

Related U.S. Application Data

(63) Continuation of application No. 11/498,288, filed on Aug. 2, 2006, now Pat. No. 8,954,886.

(51) Int. Cl.
*G06F 3/0481* (2013.01)
*G06Q 30/02* (2012.01)
(Continued)

(52) U.S. Cl.
CPC ........ *G06F 3/04812* (2013.01); *G06F 3/0481* (2013.01); *G06F 9/453* (2018.02); *G06F 16/9535* (2019.01); *G06Q 30/02* (2013.01); *G06Q 30/0269* (2013.01); *G06Q 30/0641* (2013.01); *H04L 67/306* (2013.01)

(58) Field of Classification Search
CPC ............... G06F 3/0481; G06F 3/04812; G06F 3/04817; G06F 3/0483; G06F 3/04842; G06F 11/3438; G06F 9/453; G06F 16/9535; H04L 67/22; H04L 67/306; G06Q 30/0246; G06Q 30/0269; G06Q 30/0641; G06Q 30/02
See application file for complete search history.

(56) References Cited

U.S. PATENT DOCUMENTS 6,393,407 B1 * 5/2002 Middleton, III ....... G06Q 30/02
705/14.73
6,563,514 B1 * 5/2003 Samar ............... G06F 17/30899
707/E17.119
(Continued)

OTHER PUBLICATIONS

Geisler, Gary. "Enriched Links: A Frameworkd for Improving Web Navigation Using Pop-Up Views." 2000. Journal of the American Society for INformation Science.*
(Continued)

*Primary Examiner* — Kieu D Vu
*Assistant Examiner* — Blaine T Basom
(74) *Attorney, Agent, or Firm* — SBMC

(57) ABSTRACT

A computer-implemented system and method for displaying additional information corresponding to an item represented by a visual indicator in response to a mouseover event is disclosed. Various embodiments receive a mouseover event corresponding to a visual indicator displayed on a display screen and generate additional information corresponding to an item represented by the visual indicator in response to the mouseover event, the additional information being obtained from various databases and used to generate additional information corresponding to the item.

20 Claims, 22 Drawing Sheets

(51) Int. Cl.
*G06Q 30/06* (2012.01)
*G06F 16/9535* (2019.01)
*G06F 9/451* (2018.01)
*H04L 29/08* (2006.01)

(56) References Cited

U.S. PATENT DOCUMENTS

| | | | |
|---|---|---|---|
| 6,623,529 B1 | 9/2003 | Lakritz | |
| 6,639,609 B1* | 10/2003 | Hayashi | G06F 17/3089 707/E17.116 |
| 6,834,372 B1* | 12/2004 | Becker | G06F 17/30876 707/E17.112 |
| 6,853,982 B2 | 2/2005 | Smith et al. | |
| 6,981,224 B1* | 12/2005 | Gardner | G06F 3/0481 715/760 |
| 7,003,734 B1 | 2/2006 | Gardner et al. | |
| 7,028,001 B1* | 4/2006 | Muthuswamy | G06Q 30/02 705/14.73 |
| 7,047,502 B2 | 5/2006 | Petropoulos et al. | |
| 7,225,142 B1* | 5/2007 | Apte | G06Q 30/02 380/30 |
| 7,296,230 B2* | 11/2007 | Fukatsu | G06F 17/30873 707/E17.111 |
| 7,480,716 B2* | 1/2009 | Ehrich | G06F 17/3089 707/E17.116 |
| 7,756,887 B1* | 7/2010 | Haveliwala | G06F 17/30554 707/769 |
| 7,975,019 B1* | 7/2011 | Green | G06Q 30/0241 705/14.4 |
| 8,225,195 B1* | 7/2012 | Bryar | G06F 17/30905 715/200 |
| 8,954,886 B2 | 2/2015 | Posner et al. | |
| 2002/0075332 A1 | 6/2002 | Geilfuss et al. | |
| 2004/0059997 A1* | 3/2004 | Allen | G06F 17/30899 715/207 |
| 2004/0205575 A1* | 10/2004 | Wattenberg | G06F 16/957 715/205 |
| 2004/0210602 A1* | 10/2004 | Hillis | G06F 17/3089 |
| 2005/0097595 A1* | 5/2005 | Lipsanen | G06F 21/10 725/25 |
| 2007/0100955 A1 | 5/2007 | Bodner | |
| 2007/0260521 A1 | 11/2007 | Van Der Riet | |
| 2008/0016445 A1 | 1/2008 | Dykes et al. | |
| 2008/0034329 A1 | 2/2008 | Posner et al. | |

OTHER PUBLICATIONS

Swanson, James. "Mouseover Mapping." Winter 1997. Cartographic Perspectives. No. 26. pp. 46-47.*

Witt et al. "Reducing Cognitive Overhad on the World Wide Web." 2002. ACSC '02 Proceedings of the Twenty-Fifth Australasian Conference on Computer Science. vol. 4. pp. 311-320.*

"U.S. Appl. No. 11/498,288 , Response filed Jun. 19, 2012 to Final Office Action dated Jan. 19, 2012", 15 pgs.

"U.S. Appl. No. 11/498,288 , Response filed Jul. 1, 2013 to Final Office Action dated May 1, 2013", 12 pgs.

"U.S. Appl. No. 11/498,288 Final Office Action dated Oct. 7, 2010", 17.

"U.S. Appl. No. 11/498,288, Advisory Action dated Jul. 25, 2013", 3 pgs.

"U.S. Appl. No. 11/498,288, Final Office Action dated Jan. 19, 2012", 16 pgs.

"U.S. Appl. No. 11/498,288, Final Office Action dated May 1, 2013", 14 pgs.

"U.S. Appl. No. 11/498,288, Final Office Action dated Jun. 10, 2014", 12 pgs.

"U.S. Appl. No. 11/498,288, Final Office Action dated Jul. 16, 2009", 15 pgs.

"U.S. Appl. No. 11/498,288 Non Final Office Action dated May 11, 2011", 19 pgs.

"U.S. Appl. No. 11/498,288, Non Final Office Action dated Oct. 4, 2012", 14 pgs.

"U.S. Appl. No. 11/498,288, Non Final Office Action dated Oct. 4, 2013", 14 pgs.

"U.S. Appl. No. 11/498,288, Non-Final Office Action dated Feb. 18, 2010", 19.

"U.S. Appl. No. 11/498,288, Non-Final Office Action dated Dec. 24, 2008", 19 pgs.

"U.S. Appl. No. 11/498,288, Notice of Allowance dated Oct. 6, 2014", 8 pgs.

"U.S. Appl. No. 11/498.288, Response filed Feb. 4, 2013 to Non Final Office Action dated Oct. 4, 2012", 12 pgs.

"U.S. Appl. No. 11/498,288, Response filed Mar. 7, 2011 to Final Office Action dated Oct. 7, 2010", 16 pgs.

"U.S. Appl. No. 11/498,288, Response filed Jul. 19, 2010 to Non Final Office Action dated Feb. 18, 2010", 15 pgs.

"U.S. Appl. No. 11/498,288, Response filed Sep. 10, 2014 to Final Office Action dated Jun. 10, 2014", 12 pgs.

"U.S. Appl. No. 11/498,288, Response filed Oct. 11, 2011 to Non-Final Office Action dated Nov. 11, 2011", 16 pgs.

"U.S. Appl. No. 11/498,288, Response filed Oct. 16, 2009 to Final Office Action dated Jul. 16, 2009", 14 pgs.

"U.S. Appl. No. 11/498,288, Response filed Feb. 4, 2014 to Non-Final Office Action dated Oct. 4, 2013", 14 pgs.

"U.S. Appl. No. 11/498,288, Response filed Apr. 24, 2009 to Non-Final Office Action dated Dec. 24, 2008", 19 pgs.

* cited by examiner

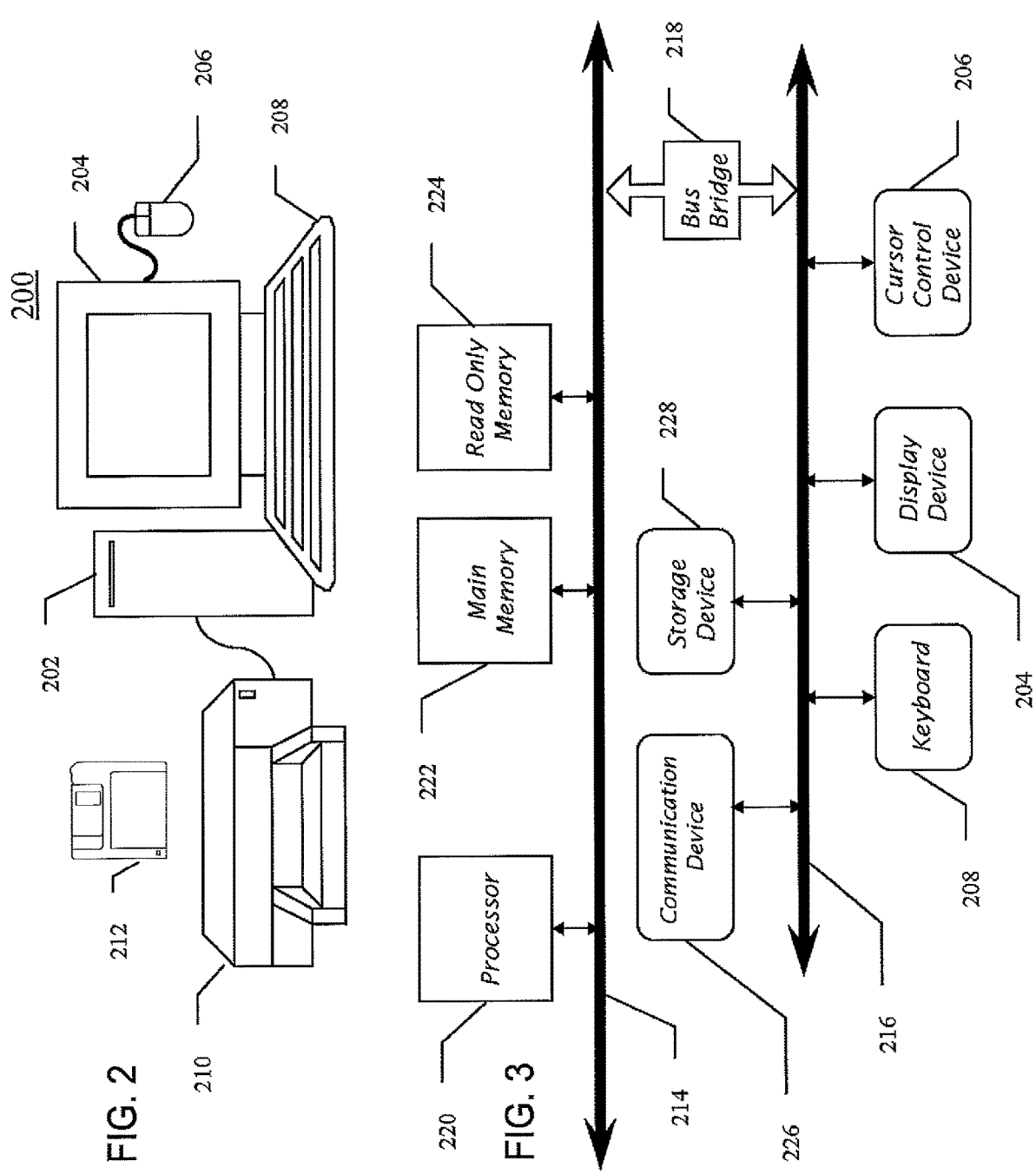

Processing Logic For For Displaying Additional Information Corresponding To A Visual Indicator In Response To A Mouseover Event
-1200-

Receive a mouseover event corresponding to a visual indicator displayed on a display screen.
-1210-

Obtain transaction information.
-1212-

Obtain user profile information.
-1214-

Generate additional information corresponding to an item represented by the visual indicator in response to the mouseover event, the additional information including information indicative of a relevance between the item and a specific user based on the user profile information and the transaction information.
-1216-

End

FIG. 12

Processing Logic For For Displaying Additional Information Corresponding To A Visual Indicator In Response To A Mouseover Event
-1300-

Receive a mouseover event corresponding to a visual indicator displayed on a display screen.
-1310-

Obtain transaction information.
-1312-

Obtain user account information.
-1314-

Generate additional information in response to the mouseover event, the additional information including an advertisement targeted at a specific user based on the transaction information and the user account information.
-1316-

End

FIG. 13

Case 1 - Seller has chosen to see the eBay counter for the VI page views — 1810

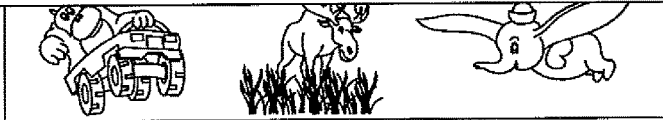

Page views     1234567890
Quick Details views     1234567890
Learn about eBay counters Shipping, payment details and return policy

| Shipping Cost | Each Additional Items | Services Available | Service Transit Time* | Available to |
|---|---|---|---|---|
| US $3.97 | + $1.00 | US Postal Service First Class Mail | Estimated delivery 2-3 days | United States only |

Case 2 - Seller has chosen to see the Andale counter for the VI page views — 1812

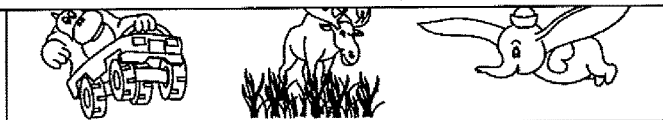

Page views     1234567890
FREE Counters and Services from Andale
Quick Details views     1234567890
Learn about eBay counters Shipping, payment details and return policy

| Shipping Cost | Each Additional Items | Services Available | Service Transit Time* | Available to |
|---|---|---|---|---|
| US $3.97 | + $1.00 | US Postal Service First Class Mail | Estimated delivery 2-3 days | United States only |

Case 3 - Seller has chosen NOT to see a counter for the VI page views — 1814

Quick Details views     1234567890
Learn about eBay counters

Shipping, payment details and return policy

| Shipping Cost | Each Additional Items | Services Available | Service Transit Time* | Available to |
|---|---|---|---|---|
| US $3.97 | + $1.00 | US Postal Service First Class Mail | Estimated delivery 2-3 days | United States only |

SYSTEM TO PRESENT ADDITIONAL ITEM INFORMATION

PRIORITY

This application is a non-provisional of and claims the benefit of priority under to U.S. patent application Ser. No. 11/498,288, filed on Aug. 2, 2006, which is hereby incorporated by reference herein in its entirety.

BACKGROUND

1. Technical Field

This disclosure relates to methods and systems supporting computer user interfaces and online transactions by a user or content (non-transactional) retrieval (e.g. searches). An example embodiment relates to displaying additional information corresponding to an item represented by a visual indicator in response to a mouseover event.

2. Related Art

An increasingly popular way of delivering information to Internet users is through the use of search engines. Given a user-input search query, usually in the form of a text search string or item selection, the search engine searches databases, websites, and the like for data items, documents, links, and the like that are most relevant to the input search query. The most relevant items are returned to the user in a search result, usually arranged in the form of a list of items on a webpage. More advanced search engines employ context information to tie the search results to particular user behaviors, identities, or profiles. Such user behaviors include user access to a particular web page, user selection (also called mouse-clicking or mouseover) of a particular location on a web page, user entry of a particular search string or keyword, and the like.

Mouseover is the term used to indicate the user action of positioning a pointing device (e.g. a computer mouse) over a visual item on a webpage or user interface display for a pre-determined length of time. Using conventional operating system and user interface tools, a mouseover can trigger a mouseover event that can cause the execution of a particular code segment that processes the mouseover event. In this manner, an action associated with the visual item on the webpage or user interface display can be triggered by a mouseover event. The mouseover is different from a mouse-click, where the user positions the mouse and then presses a selection button. The mouseover does not require the activation of a selection button.

U.S. Pat. No. 7,047,502 discloses a system for analyzing search results by offering preview information when users navigate a computer-pointing device over pre-designated areas of a search result page. A separate icon in the pre-designated area enhances the advantages by providing intuitive preview ability with seamless and natural control over a variety of preview options, such as the type of preview information and the manner in which it is presented. In addition, while operating a preview-enabled search result page, users' behavior provides data and attributes, which may be re-incorporated into the searching algorithm to improve the relevancy of search results.

Although the '502 patent offers preview information when users navigate a computer-pointing device over pre-designated areas of a search result page, the '502 patent does not describe including a count of previously received mouseover events for the same pre-designated areas of a search result. Further, the '502 patent does not describe including a page view count in the preview information. Further, the '502 patent does not describe offering a preview including information indicative of a relevance between the pre-designated areas of a search result and a specific user based on user account information. Further, the '502 patent does not describe offering a preview including an advertisement targeted at a specific user based on the user account information. Further, the '502 patent does not describe offering a preview including transaction information.

Thus, a system and method for displaying additional information corresponding to an item represented by a visual indicator in response to a mouseover event is needed.

BRIEF DESCRIPTION OF THE DRAWINGS

Embodiments illustrated by way of example and not limitation in the figures of the accompanying drawings, in which:

FIGS. 2 and 3 are block diagrams of a computer system on which an embodiment may operate.

FIGS. 5-15 are flow diagrams illustrating the processing flow in various embodiments

FIGS. 17-23 are sample screen snapshots illustrating the various embodiments.

DETAILED DESCRIPTION

A computer-implemented system and method for displaying additional information corresponding to an item represented by a visual indicator in response to a mouseover event are disclosed. In the following description, numerous specific details are set forth. However, it is understood that embodiments may be practiced without these specific details. In other instances, well-known processes, structures and techniques have not been shown in detail in order not to obscure the clarity of this description.

As described further below, according to various example embodiments of the disclosed subject matter described and claimed herein, there is provided a system and method for displaying additional information corresponding to an item represented by a visual indicator in response to a mouseover event. The system includes a mouseover event receiver operable to receive a mouseover event related to a visual indicator and an additional information retriever to display additional information related to an item represented by the visual indicator in response to the mouseover event. The visual indicator can be any object displayed on a webpage or a user interface display or any other pre-determined location on a webpage or a user interface display. Various embodiments are described below in connection with the figures provided herein.

Figure 1:
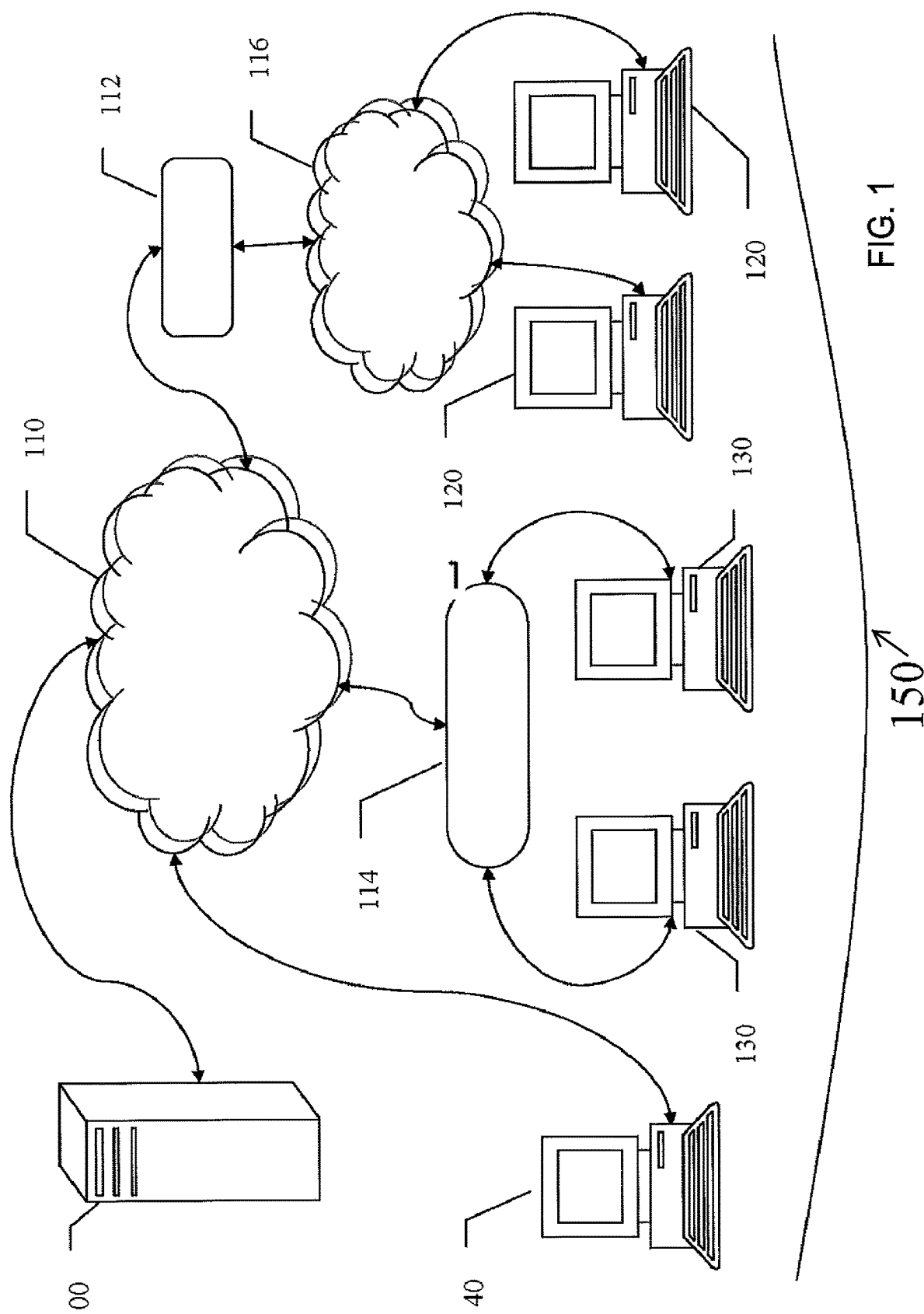
FIG. 1 is a block diagram of a network system on which an embodiment may operate.

Referring now to FIG. 1, a diagram illustrates a network environment in which various example embodiments may operate. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial-up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 150 may access image, graphical, and textual data provided by web server 100 or they may run Web application software. Conventional means exist by which clients 150 may supply information to web server 100 through the World Wide Web 110 and the web server 100 may return processed data to clients 150.

Having briefly described one embodiment of the network environment in which an example embodiment may operate, FIGS. 2 and 3 show an example of a computer system 200 illustrating an example client 150 or server 100 computer system in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described example computer system; however, the functionality of an example embodiment or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 10 and described above.

The system of an example embodiment includes software, information processing hardware, and various processing steps, which will be described below. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Figure 4:
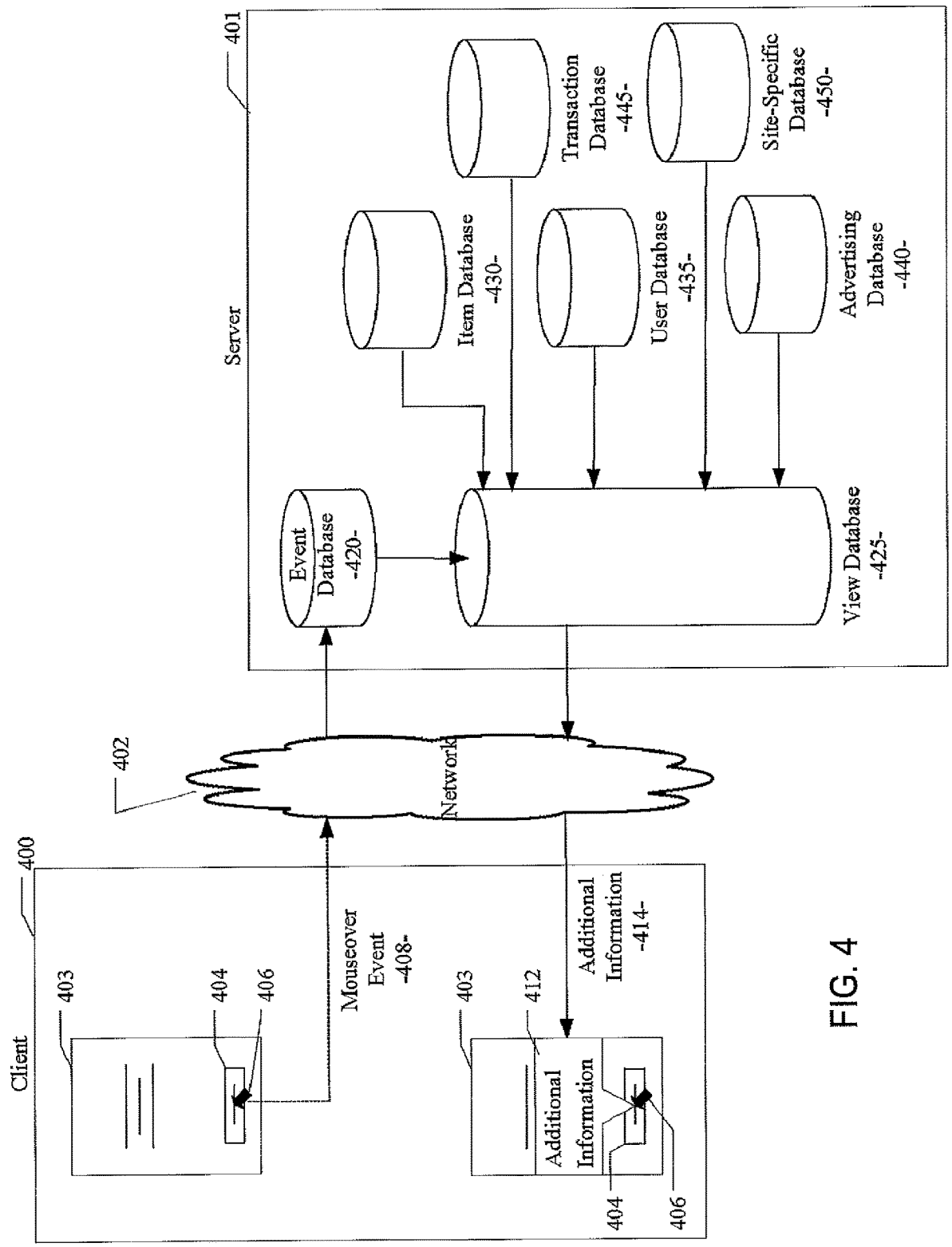
FIG. 4 illustrates a network environment in which various example embodiments may operate.

Referring to FIG. 4, an example system configuration shows a client 400 in network communication with a server 401 via a network 402. As described above, client system 400 includes a display device on which information can be displayed (e.g. web pages). An example of one such web page 403 is shown in FIG. 4. It will be apparent to those of ordinary skill in the art that other embodiments may employ conventional user interfaces for the display of information without use of browsers or web pages. The sample web page 403 may be used, for example, to display a list of items as search results in response to a user entered search query. The sample web page 403 may be used, for example, to display other visual indicators, such as data objects, hyperlinks, soft buttons, input fields, information items, and the like. One example of such a visual indicator is shown in FIG. 4 as visual indicator 404. Visual indicator 404 may represent, for example, one item in a list of items, a data object, a hyperlink, and the like. In most cases, all available information related to an item represented by the visual indicator is not displayed with the visual indicator in order to save space on the user interface display. However, a user may wish to see the additional information related to an item represented by the visual indicator with a minimum amount of effort. In various embodiments, additional information corresponding to an item represented by a visual indicator is displayed in response to a mouseover event. As shown in FIG. 4, a user positions a pointing device or cursor control device (e.g. mouse) represented by arrow 406 within a region associated with visual indicator 404. After the pointing device remains within a region associated with visual indicator 404 for a pre-configured length of time, the client system 400 automatically generates a mouseover event 408 without further user action. The mouseover event 408, and associated information, is sent to a server 401 via a network 402. The information associated with the mouseover event 408 includes an identification of the visual indicator 404 (or corresponding display screen location) that caused the mouseover event 408.

In response to receiving such a mouseover event 408, server 401 stores an instance of the mouseover event 408 in event database 420. Additionally, server 401 can use the identification of the visual indicator 404 associated with the mouseover event 408 to look up additional information associated with the visual indicator 404 in one or more databases 430-450 on, or accessible to, server 401. In this manner, additional information associated with the visual indicator 404 can be retrieved and assembled into a view of additional information stored in view database 425. Once a view of additional information associated with the visual indicator 404 is generated in database 425, the additional information can be sent back to client 400 via network 402. The additional information 414 can then be displayed in web page 403 in a location proximate to the visual indicator 404 that caused the mouseover event 408 and the generation of the resulting view of additional information associated with the visual indicator 404. As shown, the additional information 414 can be displayed with a pointer that points to the corresponding the visual indicator 404. In this manner, the server 401 can receive a mouseover event corresponding to a visual indicator displayed on a client display screen, and generate for display additional information corresponding to an item represented by the visual indicator in response to the mouseover event.

In various embodiments, the additional information corresponding to an item represented by the visual indicator generated in response to the mouseover event can be a variety of different information, depending upon the item to which the information relates. For example, referring again to FIG. 4, the server 401 includes an item database 430. Item database 430 can be used for the storage of data related to a variety of items offered for sale, lease, auction, donation, examination, and the like. Some or all of the items in Item database 430 can be listed in a web page, such as web page 403. Each item listed can include a visual indicator 404 associated with or representing the listed item. When a user of client system 400 positions a pointing device in proximity to the visual indicator 404 for the requisite length of time, a mouseover event 408 is generated and the mouseover event 408 with information indicative of the visual indicator 404 is sent to server 401. In response to the mouseover event 408, server 401 accesses item database 430 to obtain additional information related to the item listed on web page 403 and associated with the visual indicator 404. This additional information for the listed item can include descriptive details of the item, pricing information, bidding information, availability information, shipping information, and the like. This additional information associated with the listed item is thereby displayed in response to the mouseover event without requiring further action from a user of client system 400.

In some cases, it is beneficial to know the number of times a particular item has been the object of a mouseover event. A high number of mouseover events associated with a particular item may correlate to a high level of user interest in the item. Thus, various embodiments also increment a running count of mouseover events associated with each item in item database 430. The mouseover event counts can be stored in event database 420 or in item database 430. In response to a mouseover event 408, server 401 increments a mouseover event count for the item and accesses Item database 430 to obtain additional information related to the item listed on web page 403 and associated with the visual indicator 404. This additional information for the listed item can include the current mouseover event count for the particular item. The current mouseover event count for the item can thereby be displayed with the additional information 414 on client web page 403. In this manner, server 401 can generate additional information corresponding to an item represented by the visual indicator in response to the mouseover event, the additional information including a count of previously received mouseover events for the same visual indicator.

In a similar manner, various embodiments also increment a running count of page views associated with views of items from item database 430. The page view counts can be stored in event database 420. In response to a mouseover event 408, server 401 increments a page view count for the item and accesses item database 430 to obtain additional information related to the item listed on web page 403 and associated with the visual indicator 404. This additional information for the listed item can include the current page view count associated with the particular item. The current page view count can thereby be displayed with the additional information 414 on client web page 403. In various embodiments, the mouseover event counts and the page view counts can be initialized at the start of a new session, on initial user log-in, on restart of the computer system, or at other system-configurable times. In this manner, server 401 can generate additional information corresponding to an item represented by the visual indicator in response to the mouseover event, the additional information including a page view count.

Various embodiments can also store multimedia content (e.g. images, pictures, graphics, animations, audio files, videos, and the like), which is associated with items represented by a visual indicator. The multimedia content associated with items can be stored in item database 430. In response to a mouseover event 408, server 401 accesses item database 430 to obtain additional information related to the item listed on web page 403 and represented by the visual indicator 404. This additional information for the listed item can include multimedia content associated with the particular item. The multimedia content can thereby be displayed, played, and/or rendered with the additional information 414 on client web page 403. In this manner, server 401 can generate additional information corresponding to an item represented by the visual indicator in response to the mouseover event, the additional information including multimedia content related to an item represented by the visual indicator.

In many circumstances, it is beneficial to customize the additional information displayed in response to a mouseover event based on the identity of current user of client system 400. The identity of the current user of client system 400 can be determined in conventional ways from a log-in identifier and/or a cookie stored on the client system 400. Once the user identity is determined, a user account associated with the identified user can be obtained. User accounts can be stored in user database 435. In the various embodiments described herein, a user account can be defined as user-specific information either entered explicitly during user registration or automatically generated during unregistered guest access to a webpage or other network location. The user-specific information uniquely identifies a particular user to the system. A user profile, which can also be stored in user database 435, comprises historical, behavioral, and preference information captured over time and associated with a particular user as identified with user account information. In various embodiments described below, the user profile information relates to relevance determination. User account information is related to user-specific information, for example, username, user shipping information, or user credit card numbers, and the like.

In the various embodiments described above, it may be beneficial to display mouseover event counts and/or page view counts only for particular users with an appropriate level of access. These access levels can be established using conventional means. If such access restrictions are enforced in various embodiments, in response to a mouseover event 408, server 401 receives a user identifier and an item identifier from the client 400 and increments a mouseover event count and/or a page view count for the item. Server 401 accesses Item database 430 to obtain additional information related to the item listed on web page 403 and associated with the visual indicator 404 for which a mouseover event 408 was received. Server 401 can also access the user database 435 to determine if the identified user has the access privilege to see the mouseover event counts and/or page view counts. If so, server 401 includes the counts in the additional information 414 sent to client 400. If not, server 401 excludes the counts from the additional information 414 sent to client 400.

In other embodiments, the user account information and the user profile information is used to provide context for the additional information displayed in response to a mouseover event. For example, as described above, the identity of the current user of client system 400 can be determined. Additionally, given the user identity, a corresponding user account and a user profile stored in user database 435 can be obtained. In response to a mouseover event 408, server 401 receives the user identifier and an item identifier from the client 400. The item identified by the item identifier corresponds to the item represented by the visual indicator 404 that led to the mouseover event 408. Server 401 can then access item database 430 to obtain additional information related to the item listed on web page 403 and represented by the visual indicator 404 for which a mouseover event 408 was received. Server 401 can also access the user database 435 to obtain a corresponding user account and a user profile. Given the user account information, the user profile information, and the item information associated with the visual indicator 404 for which a mouseover event 408 was received, server 401 can generate a variety of useful correlations and thereby produce a set of customized additional information for display on client 400.

The item information can be compared with the user profile information to determine the likely level of relevancy between the characteristics of the item for which the user performed a mouseover operation and the user preferences as described in the user profile. For example, a user may have performed several prior searches for auto parts. Such search queries may be stored in the user's profile. If the user subsequently performs a mouseover operation on an auto parts item listed on web page 403, the server 401 can signal a high level of relevancy in the additional information 414 sent to client 400. Conversely, if the user subsequently performs a mouseover operation on a gardening item listed on web page 403, the server 401 can signal a low level of relevancy in the additional information 414 sent to client 400. Various intermediate levels of relevancy can also be indicated. Various intermediate levels of relevancy can be indicated in a variety of ways including, for example, a numeric relevancy value or score, various colors, font selections, text strings, and the like. In this manner, server 401 can obtain user profile information, and generate additional information corresponding to an item represented by a visual indicator in response to the mouseover event, the additional information including information indicative of the relevance between the visual indicator and a specific user based on the user profile information.

The item information can also be compared with the user account information to obtain user-specific information based on the user account information and related to the item for which the user performed a mouseover operation. For example, a user may have entered a set of preferences into his/her user account information. Such preferences may include a preference for shipping purchased products in a particular manner, credit card selections, product color or size selections, modes of merchant feedback/communication, and the like. For example, if the user subsequently performs a mouseover operation on an item for sale that is listed on web page 403, the server 401 can obtain the users shipping preferences from the user account information and automatically compute the shipping charges for the mouseover item. In this manner, server 401 can obtain user account information, and generate additional information corresponding to an item represented by the visual indicator in response to the mouseover event, the additional information including user-specific information based on the user account information.

In other embodiments, the user account information and/or the user profile information can be used to generate targeted (user-specific) advertisements. Generic advertising content can be stored in advertising database 440. The targeted advertisements are generated from the generic advertising content by server 401, saved in advertising database 440, and sent to client 400 as the additional information displayed in response to a mouseover event. For example, as described above, the identity of the current user of client system 400 can be determined. Additionally, given the user identity, a corresponding user account and a user profile stored in user database 435 can be obtained. In response to a mouseover event 408, server 401 receives the user identifier and an item identifier from the client 400. The item identified by the item identifier corresponds to the item represented by the visual indicator 404 that led to the mouseover event 408. Server 401 can then access item database 430 to obtain additional information related to the item listed on web page 403 and associated with the visual indicator 404 for which a mouseover event 408 was received. Server 401 can also access the user database 435 to obtain a corresponding user account and a user profile. Given the user account information, the user profile information, and the item information associated with the visual indicator 404 for which a mouseover event 408 was received, server 401 can generate targeted (user-specific) advertisements and thereby produce a set of customized additional information for display on client 400. In this manner, server 401 can obtain user account information, and generate additional information in response to the mouseover event, the additional information including an advertisement targeted at a specific user based on the user account information.

In other embodiments, transaction information is used to provide transactional context for the additional information displayed in response to a mouseover event. Transaction information can include commercial and financial information related to the buying, selling, leasing, ordering, inquiring, and offering of goods and services. Conventional systems collect transaction information in the normal course of business. Such transaction information can be retained in transaction database 445. In some cases, each transaction can be cross-referenced to a particular product or item. In other cases, each transaction can be cross-referenced to a particular seller or purchaser (user). In response to a mouseover event 408, server 401 receives the user identifier and an item identifier from the client 400. The item identified by the item identifier corresponds to the item represented by the visual indicator 404 that led to the mouseover event 408. Server 401 can then access item database 430, if necessary, to obtain additional information related to the item listed on web page 403 and represented by the visual indicator 404 for which a mouseover event 408 was received. Server 401 can also access, if necessary, the user database 435 to obtain a corresponding user account and a user profile. Given the user account information, the user profile information, and the item information associated with the visual indicator 404 for which a mouseover event 408 was received, server 401 can access the transaction database 445 to generate a variety of useful correlations between and among the mouseover item, the user, and prior transactions involving the same or similar items, the same or related user/purchaser, the same or related seller/manufacturer/distributor, the same or similar item category, the same or similar price point, and the like. The transaction information obtained from the transaction database 445 can also include a seller rating, a seller location, and a transaction history with other buyers similar to the user/purchaser. This transaction information is used in various embodiments to generate a variety of useful correlations to the mouseover item and thereby increase the likelihood that the user/purchaser will complete a transaction. Server 401 can thereby produce a set of customized transaction-related additional information for display on client 400. In this manner, server 401 can obtain transaction information, and generate additional information corresponding to an item represented by the visual indicator in response to the mouseover event, the additional information including the transaction information.

In various embodiments, item information can be compared with the user profile information and transaction information to determine the likely level of relevancy between the characteristics of the item for which the user performed a mouseover operation and the user preferences and/or behavior as described in the user profile and in the transaction information. For example, a user may have performed several prior searches for auto parts. Such search queries may be stored in the user's profile. Further, transaction information may indicate that there is a strong correlation between purchases of auto parts and purchases of new cars. If the user subsequently performs a mouseover operation on a new car item listed on web page 403, the server 401 can signal a high level of relevancy in the additional information 414 sent to client 400. Conversely, if the user subsequently performs a mouseover operation on a gardening item listed on web page 403, the server 401 can signal a low level of relevancy in the additional information 414 sent to client 400. Various intermediate levels of relevancy can also be indicated. Various intermediate levels of relevancy can be indicated in a variety of ways including, for example, a numeric relevancy value or score, various colors, font selections, text strings, and the like. In this manner, server 401 can obtain transaction information and user profile information, and generate additional information corresponding to an item represented by the visual indicator in response to the mouseover event, the additional information including information indicative of a relevance between the item represented by the visual indicator and a specific user based on the user profile information and the transaction information.

In other embodiments, the user account information and/or the user profile information can be used in combination with transaction information to generate targeted (user-specific) advertisements. The targeted advertisements are generated by server 401 and sent to client 400 as the additional information displayed in response to a mouseover event. For example, as described above, the identity of the current user of client system 400 can be determined. Additionally, given the user identity, a corresponding user account and a user profile stored in user database 435 can be obtained. In response to a mouseover event 408, server 401 receives the user identifier and an item identifier from the client 400. The item identified by the item identifier corresponds to the item represented by the visual indicator 404 that led to the mouseover event 408. Server 401 can then access item database 430 to obtain additional information related to the item listed on web page 403 and associated with the visual indicator 404 for which a mouseover event 408 was received. Server 401 can also access the user database 435 to obtain a corresponding user account and a user profile. Given the user account information, the user profile information, and the item information associated with the visual indicator 404 for which a mouseover event 408 was received, server 401 can access the transaction database 445 to generate a variety of useful correlations between and among the mouseover item, the user, and prior transactions involving the same or similar items and the same user. Server 401 can thereby produce a set of customized transaction-related additional information for display on client 400. Given the user account information, the user profile information, the transaction information, and the item information associated with the visual indicator 404 for which a mouseover event 408 was received, server 401 can generate targeted (user-specific) advertisements and thereby produce a set of customized additional information for display on client 400. In this manner, server 401 can obtain transaction information and user account information, and generate additional information in response to the mouseover event, the additional information including an advertisement targeted at a specific user based on the transaction information and the user account information.

In other embodiments, site-specific information is used to provide site-specific context for the additional information displayed in response to a mouseover event. Site-specific information can include local, regional, or country-specific items, translations, site-specific logos, and other location-specific commercial and financial information related to the buying, selling, leasing, ordering, inquiring, and offering of goods and services. Conventional systems collect site-specific information in the normal course of business. Such site-specific information can be retained in site-specific database 450. In some cases, each item can be cross-referenced to one or more locations. In other cases, particular users can be cross-referenced to one or more locations. In response to a mouseover event 408, server 401 receives the user identifier and an item identifier from the client 400. The item identified by the item identifier corresponds to the item represented by the visual indicator 404 that led to the mouseover event 408. Server 401 can then access item database 430, if necessary, to obtain additional information related to the item listed on web page 403 and represented by the visual indicator 404 for which a mouseover event 408 was received. Server 401 can also access, if necessary, the user database 435 to obtain a corresponding user account. Given the user account information, and the item information associated with the visual indicator 404 for which a mouseover event 408 was received, server 401 can access the site-specific database 450 to generate a variety of useful site-specific information related to the mouseover item and the user. Server 401 can thereby produce a set of customized site-specific additional information for display on client 400. In this manner, server 401 can obtain site-specific information, and generate additional information corresponding to an item represented by the visual indicator in response to the mouseover event, the additional information including the site-specific information.

Figure 16:
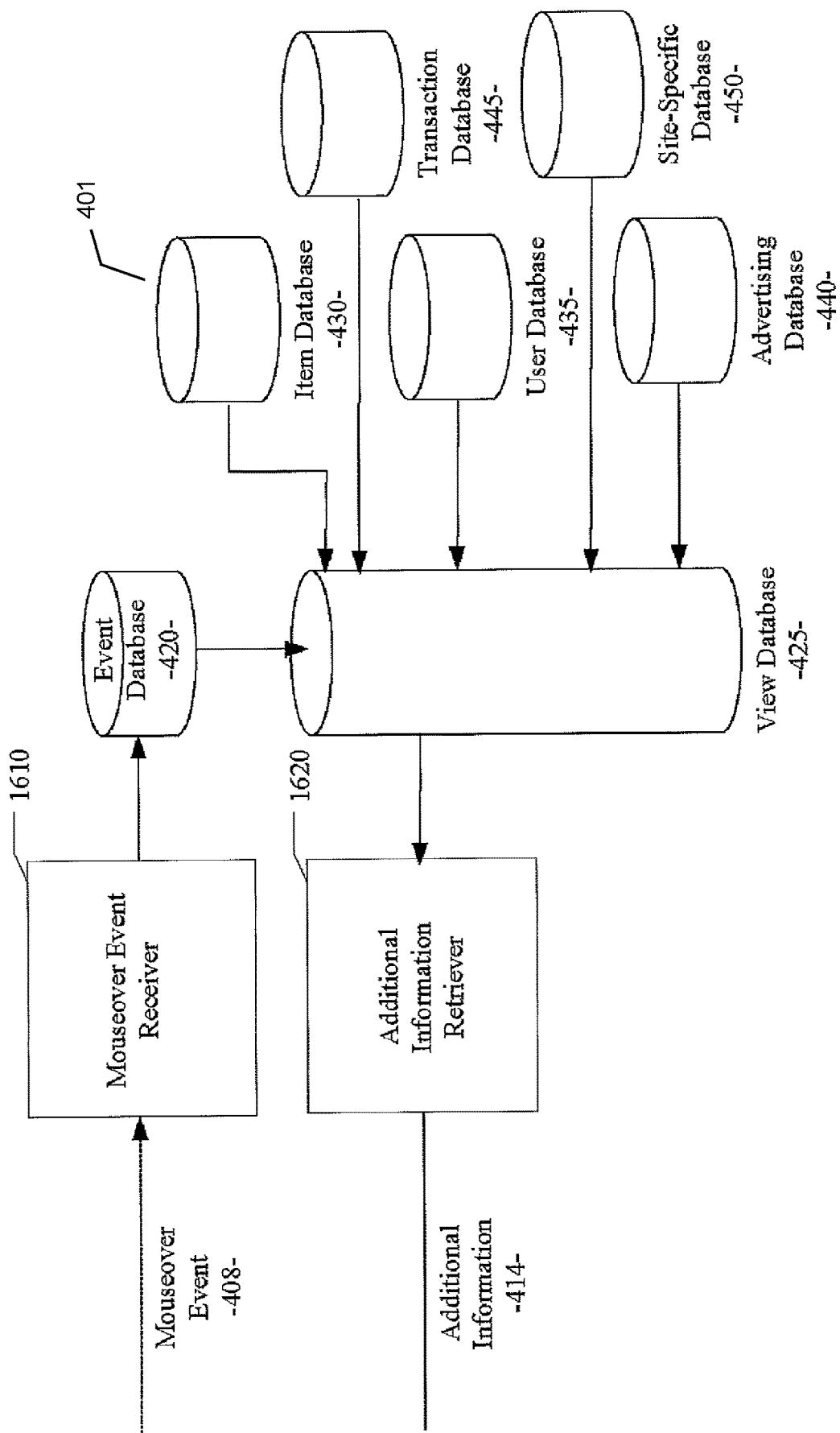
FIG. 16 illustrates a system implementing various example embodiments.

Referring now to FIG. 16, an example of a system implementing various embodiments is illustrated. As shown, a mouseover event receiver 1610 receives a mouseover event 408 corresponding to a visual indicator displayed on a display screen. It will be apparent to those of ordinary skill in the art that mouseover event receiver 1610 can be implemented in software components, and/or hardware components, and/or combinations thereof. It will also be apparent to those of ordinary skill in the art that mouseover event receiver 1610 can be implemented in client 400, server 401, or partially in both client 400 and server 401. Upon receiving a mouseover event 408, mouseover event receiver 1610 posts the mouseover event 408 in event database 420. This mouseover event posting alerts the activation of additional information retriever 1620. Additional information retriever 1620 obtains information from various databases 430-450 and generates additional information corresponding to an item represented by the visual indicator in response to the mouseover event. The additional information can include a variety of information related to the user, other related items, related sellers, advertisements, transactions, site-specific information, and the like.

Figure 5:
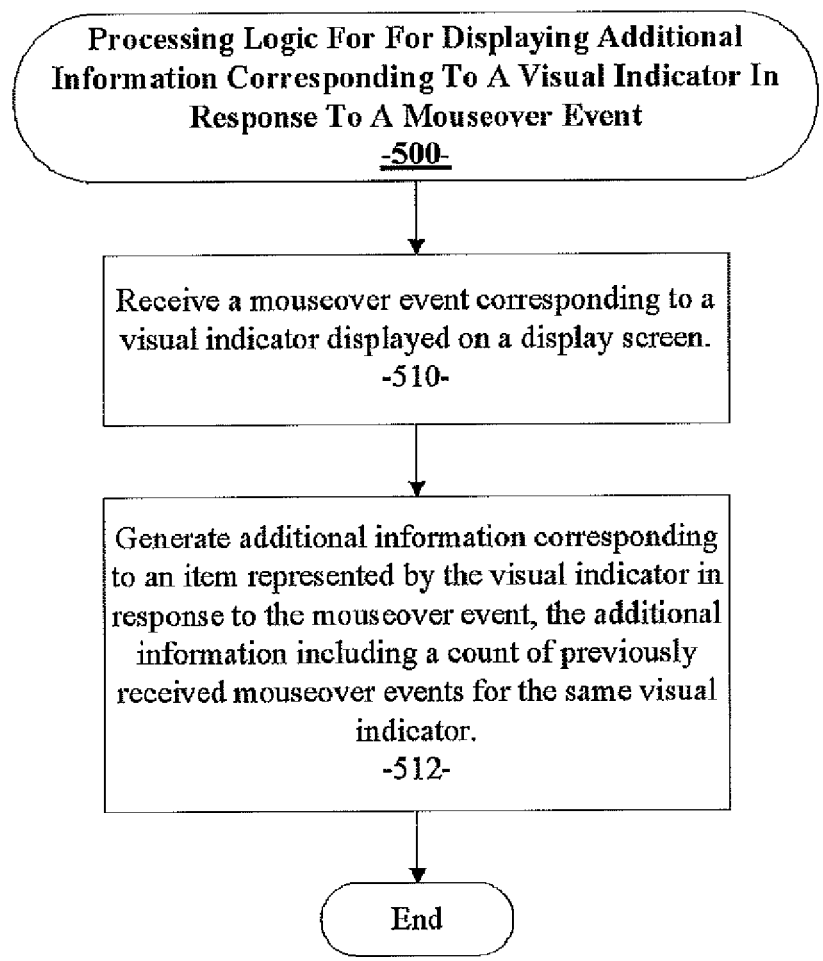

FIGS. 5-15 are flow diagrams illustrating the processing flow used in various embodiments. Referring now to FIG. 5, an embodiment of the processing flow used for displaying additional information corresponding to an item represented by a visual indicator in response to a mouseover event is illustrated. In processing block 510, the mouseover event receiver 1610 receives a mouseover event corresponding to a visual indicator displayed on a display screen. In processing block 512, the additional information retriever 1620 generates additional information corresponding to an item represented by the visual indicator in response to the mouseover event, the additional information including a count of previously received mouseover events for the same visual indicator.

Figure 6:
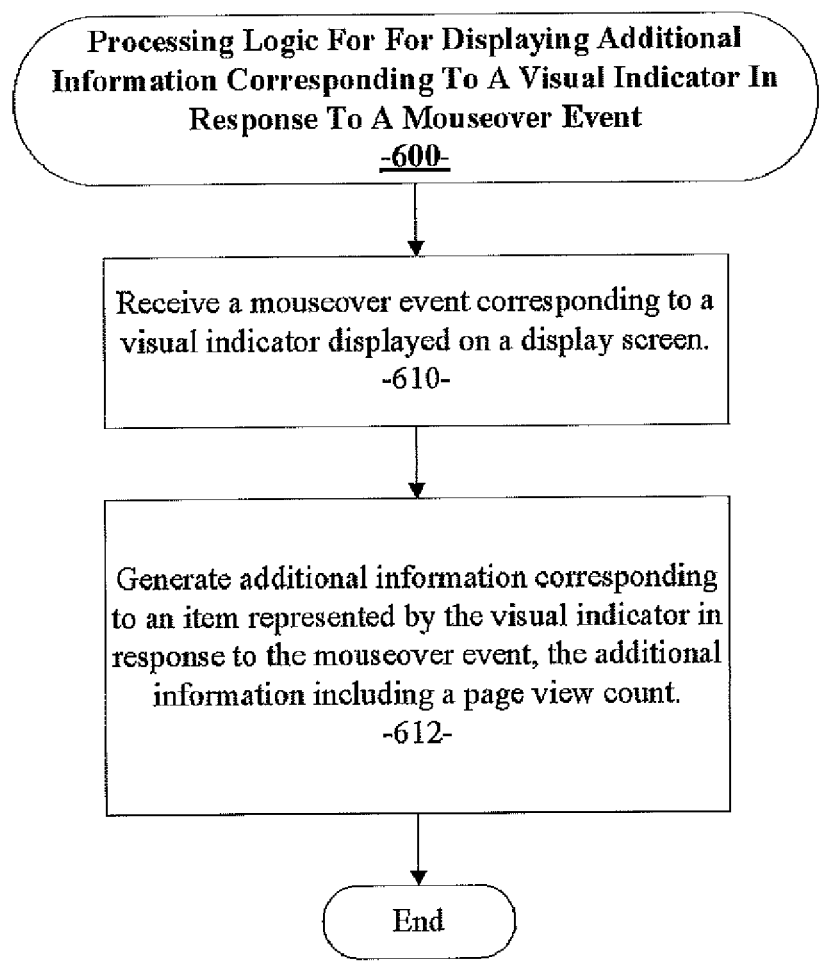

Referring now to FIG. 6, an embodiment of the processing flow used for displaying additional information corresponding to an item represented by a visual indicator in response to a mouseover event is illustrated. In processing block 610, the mouseover event receiver 1610 receives a mouseover event corresponding to a visual indicator displayed on a display screen. In processing block 612, the additional information retriever 1620 generates additional information corresponding to an item represented by the visual indicator in response to the mouseover event, the additional information including a page view count.

Figure 7:
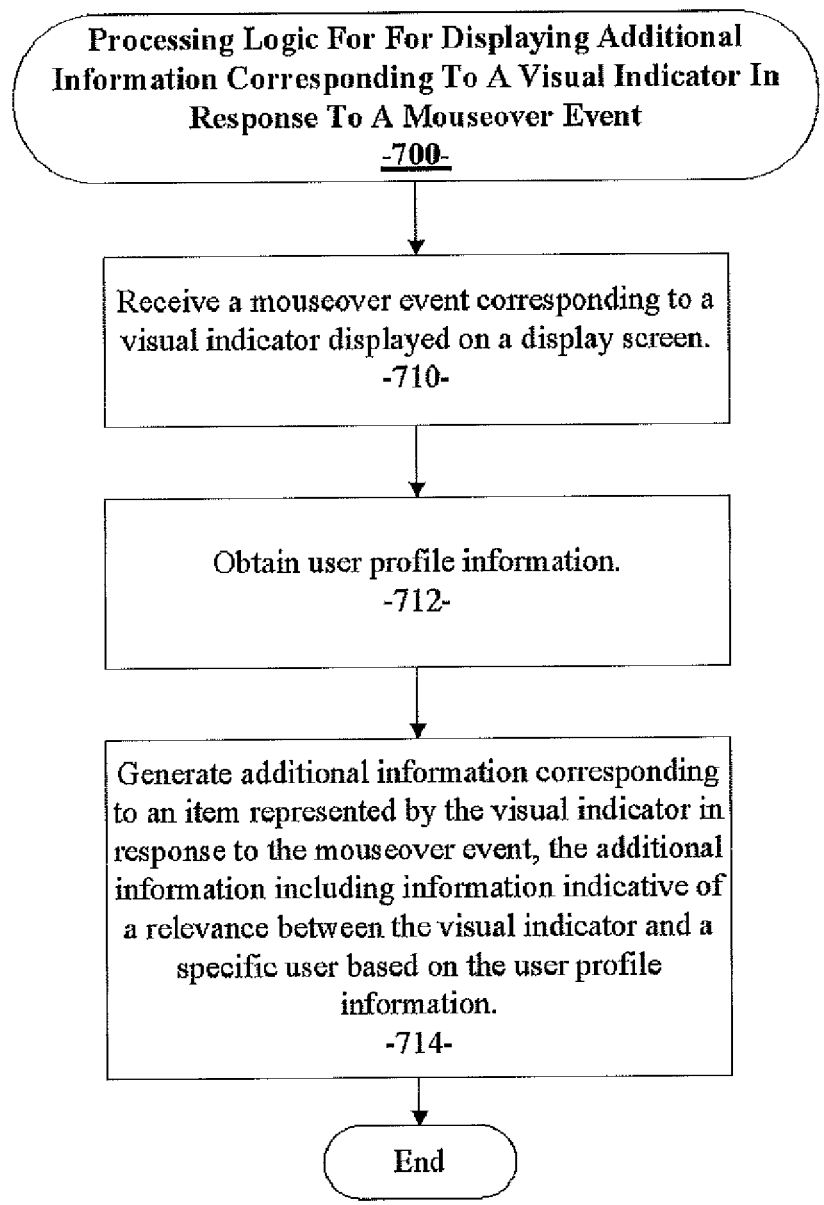

Referring now to FIG. 7, an embodiment of the processing flow used for displaying additional information corresponding to an item represented by a visual indicator in response to a mouseover event is illustrated. In processing block 710, the mouseover event receiver 1610 receives a mouseover event corresponding to a visual indicator displayed on a display screen. In processing block 712, the additional information retriever 1620 obtains user profile information. In processing block 714, the additional information retriever 1620 generates additional information corresponding to an item represented by the visual indicator in response to the mouseover event, the additional information including information indicative of the relevance between the visual indicator and a specific user based on the user profile information.

Figure 8:
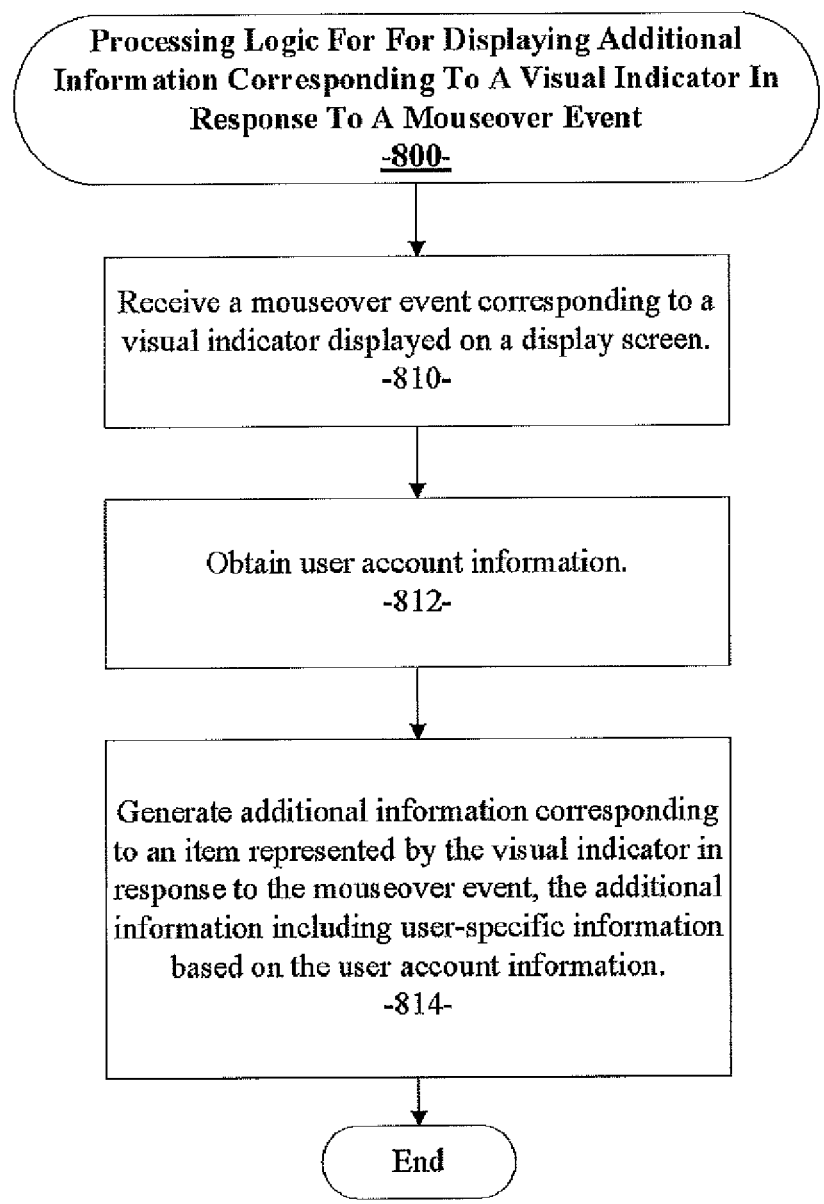

Referring now to FIG. 8, an embodiment of the processing flow used for displaying additional information corresponding to an item represented by a visual indicator in response to a mouseover event is illustrated. In processing block 810, the mouseover event receiver 1610 receives a mouseover event corresponding to a visual indicator displayed on a display screen. In processing block 812, the additional information retriever 1620 obtains user account information. In processing block 814, the additional information retriever 1620 generates additional information corresponding to an item represented by the visual indicator in response to the mouseover event, the additional information including user-specific information based on the user account information.

Figure 9:
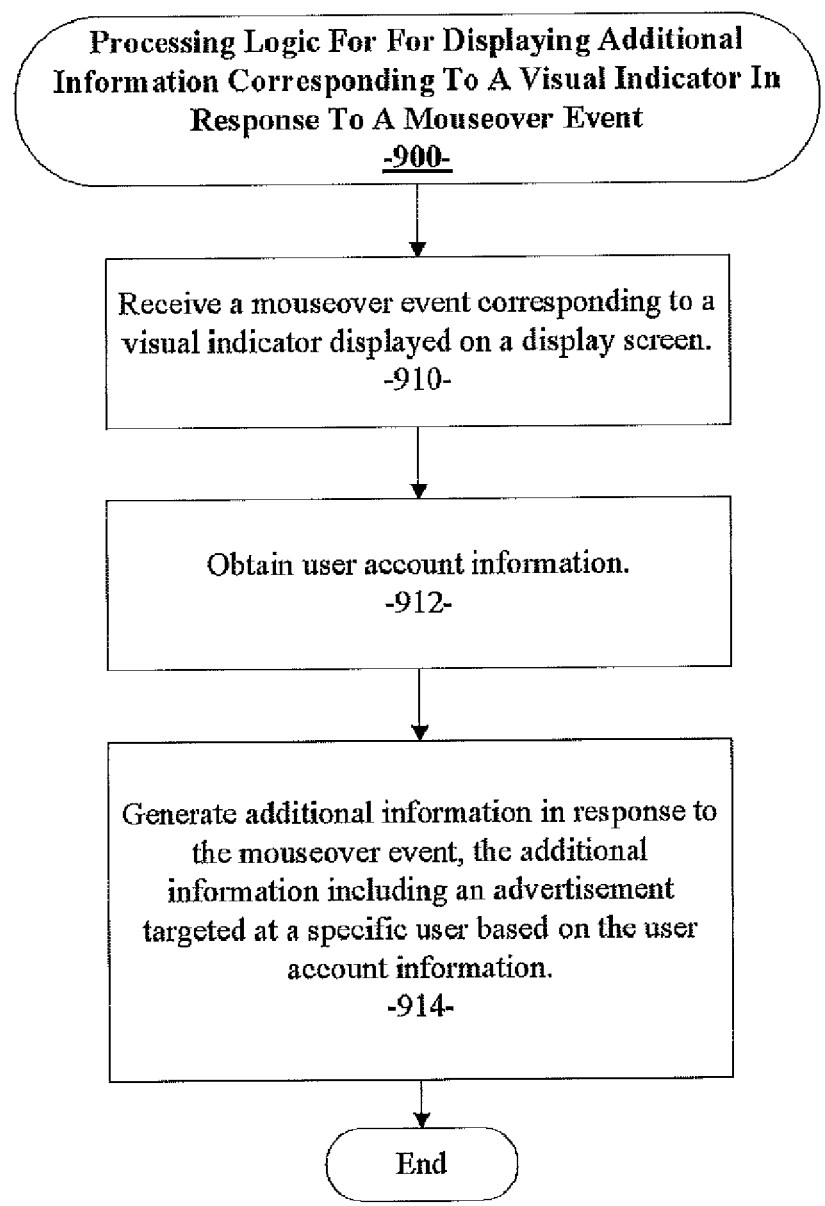

Referring now to FIG. 9, an embodiment of the processing flow used for displaying additional information corresponding to an item represented by a visual indicator in response to a mouseover event is illustrated. In processing block 910, the mouseover event receiver 1610 receives a mouseover event corresponding to a visual indicator displayed on a display screen. In processing block 912, the additional information retriever 1620 obtains user account information. In processing block 914, the additional information retriever 1620 generates additional information in response to the mouseover event, the additional information including an advertisement targeted at a specific user based on the user account information.

Figure 10:
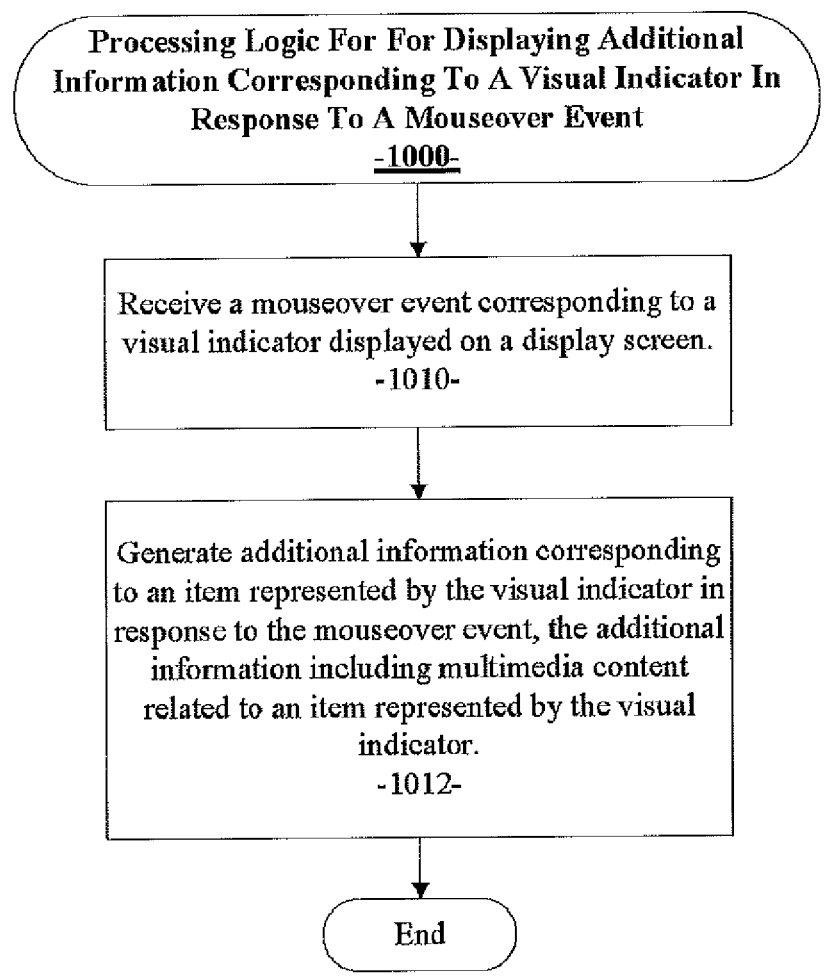

Referring now to FIG. 10, an embodiment of the processing flow used for displaying additional information corresponding to an item represented by a visual indicator in response to a mouseover event is illustrated. In processing block 1010, the mouseover event receiver 1610 receives a mouseover event corresponding to a visual indicator displayed on a display screen. In processing block 1012, the additional information retriever 1620 generates additional information corresponding to an item represented by the visual indicator in response to the mouseover event, the additional information including multimedia content related to an item represented by the visual indicator.

Figure 11:
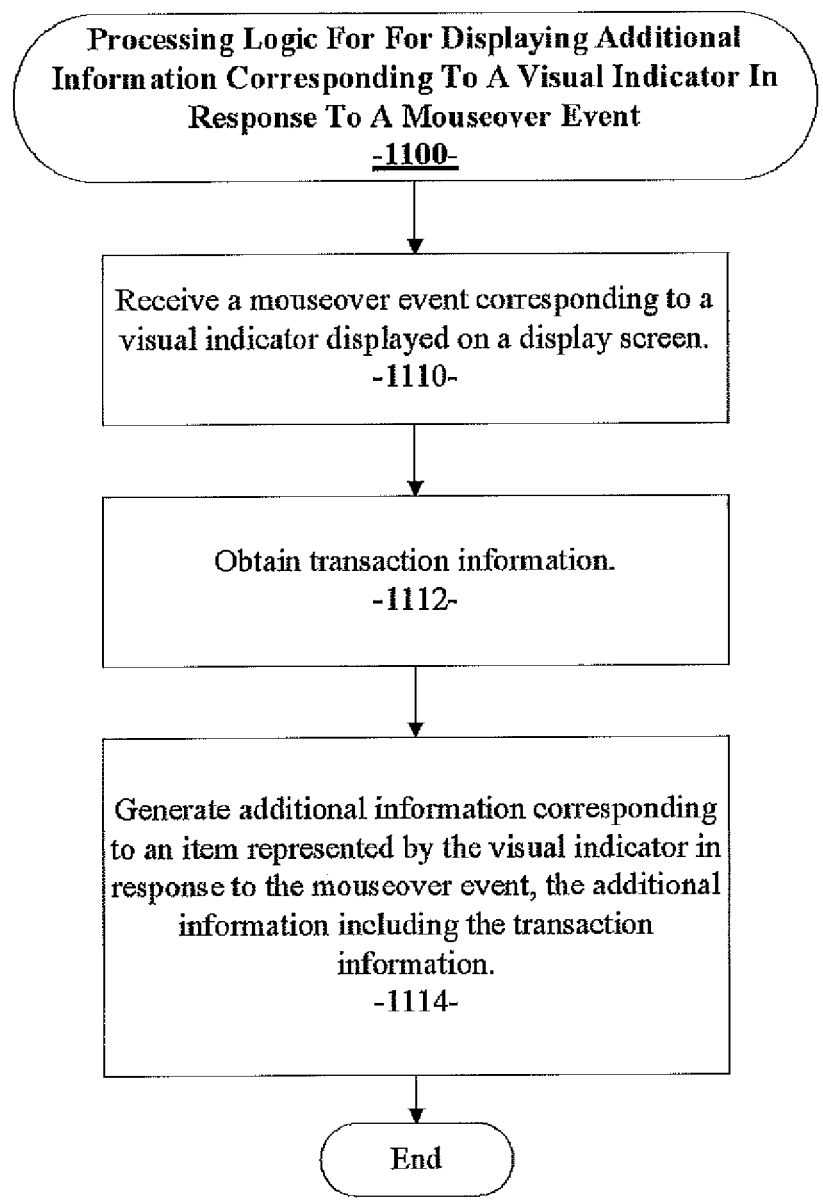

Referring now to FIG. 11, an embodiment of the processing flow used for displaying additional information corresponding to an item represented by a visual indicator in response to a mouseover event is illustrated. In processing block 1110, the mouseover event receiver 1610 receives a mouseover event corresponding to a visual indicator displayed on a display screen. In processing block 1112, the additional information retriever 1620 obtains transaction information. In processing block 1114, the additional information retriever 1620 generates additional information corresponding to an item represented by the visual indicator in response to the mouseover event, the additional information including the transaction information.

Referring now to FIG. 12, an embodiment of the processing flow used for displaying additional information corresponding to an item represented by a visual indicator in response to a mouseover event is illustrated. In processing block 1210, the mouseover event receiver 1610 receives a mouseover event corresponding to a visual indicator displayed on a display screen. In processing block 1212, the additional information retriever 1620 obtains transaction information. In processing block 1214, the additional information retriever 1620 obtains user profile information. In processing block 1216, the additional information retriever 1620 generates additional information corresponding to an item represented by the visual indicator in response to the mouseover event, the additional information including information indicative of a relevance between the item and a specific user based on the user profile information and the transaction information.

Referring now to FIG. 13, an embodiment of the processing flow used for displaying additional information corresponding to an item represented by a visual indicator in response to a mouseover event is illustrated. In processing block 1310, the mouseover event receiver 1610 receives a mouseover event corresponding to a visual indicator displayed on a display screen. In processing block 1312, the additional information retriever 1620 obtains transaction information. In processing block 1314, the additional information retriever 1620 obtains user account information. In processing block 1316, the additional information retriever 1620 generates additional information in response to the mouseover event, the additional information including an advertisement targeted at a specific user based on the transaction information and the user account information.

Figure 14:
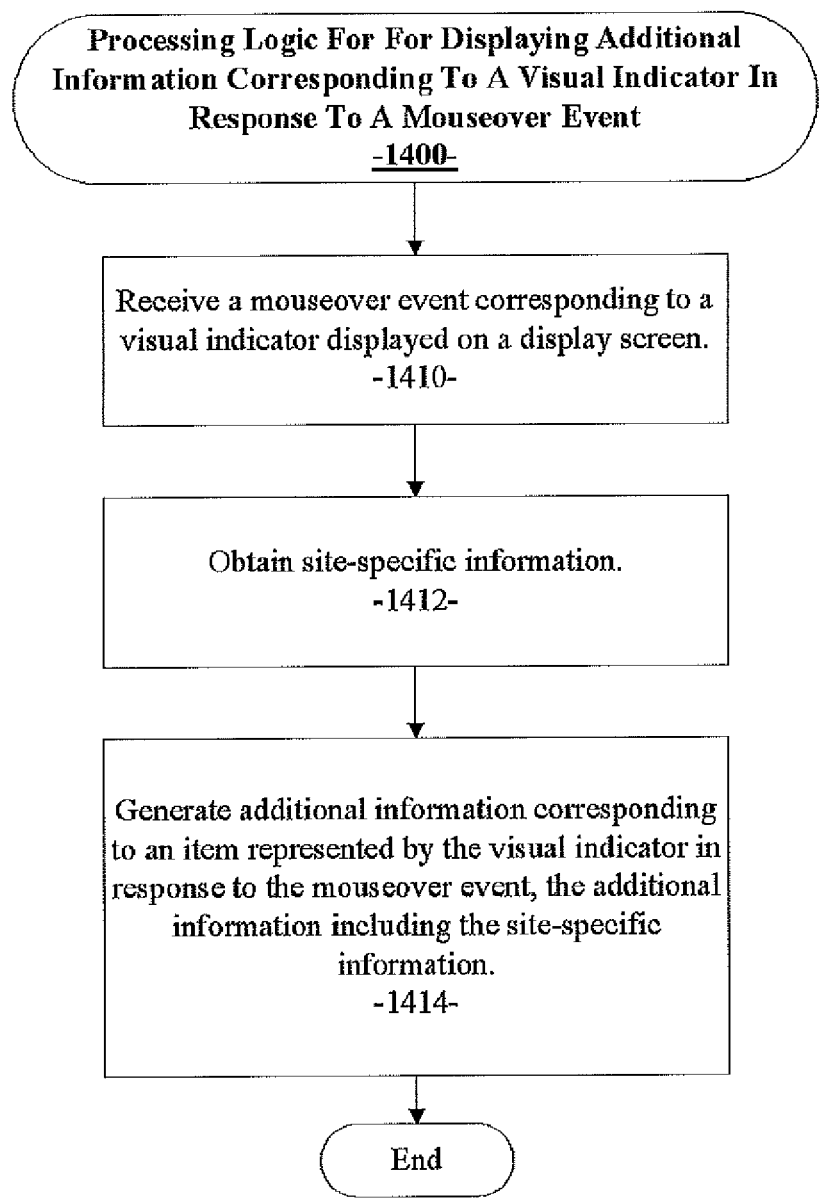

Referring now to FIG. 14, an embodiment of the processing flow used for displaying additional information corresponding to an item represented by a visual indicator in response to a mouseover event is illustrated. In processing block 1410, the mouseover event receiver 1610 receives a mouseover event corresponding to a visual indicator displayed on a display screen. In processing block 1412, the additional information retriever 1620 obtains site-specific information. In processing block 1414, the additional information retriever 1620 generates additional information corresponding to an item represented by the visual indicator in response to the mouseover event, the additional information including the site-specific information.

Figure 15:
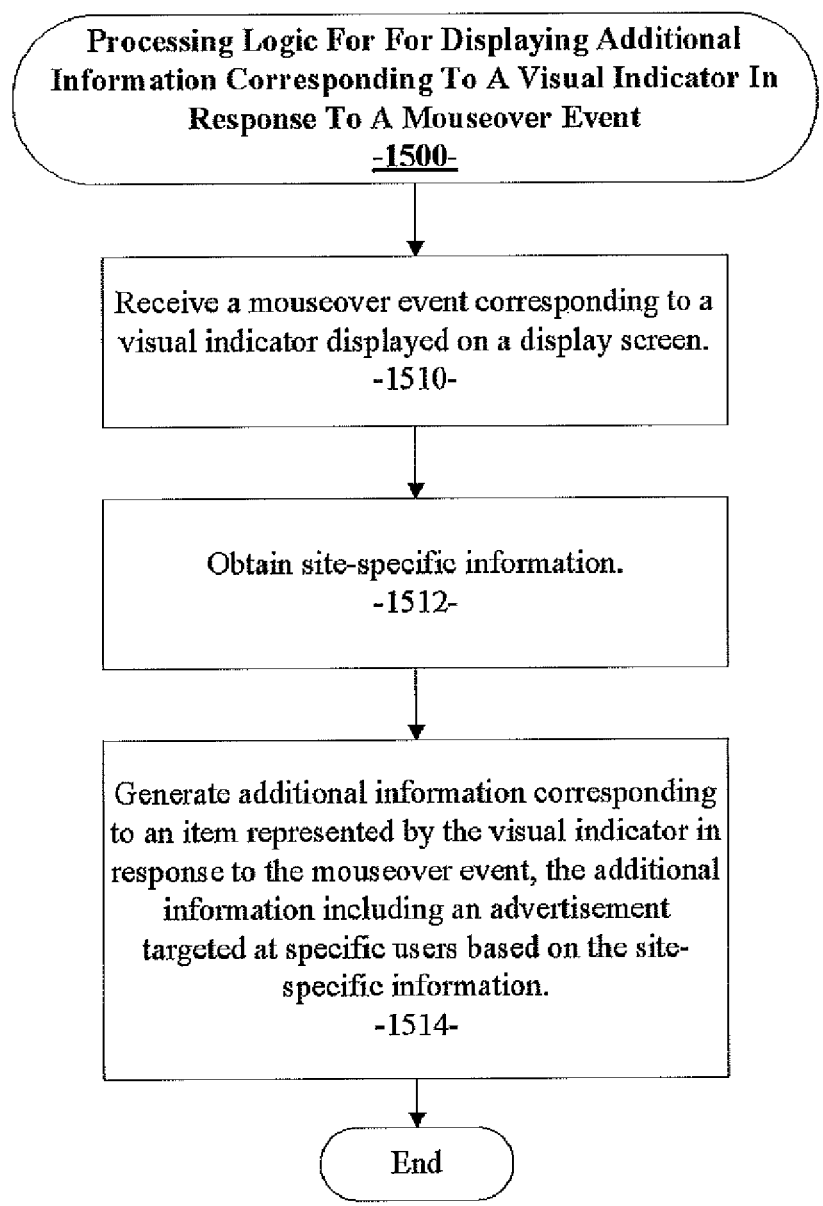

Referring now to FIG. 15, an embodiment of the processing flow used for displaying additional information corresponding to an item represented by a visual indicator in response to a mouseover event is illustrated. In processing block 1510, the mouseover event receiver 1610 receives a mouseover event corresponding to a visual indicator displayed on a display screen. In processing block 1512, the additional information retriever 1620 obtains site-specific information. In processing block 1514, the additional information retriever 1620 generates additional information corresponding to an item represented by the visual indicator in response to the mouseover event, the additional information including an advertisement targeted at specific users based on the site-specific information.

Figure 17:
Figure 18:

FIGS. 17-19 are sample screen snapshots illustrating the various embodiments. In FIG. 17, an additional information block 1710 is shown in response to a mouseover event corresponding to the placement of a point device in proximity to a visual indicator corresponding to an item (e.g. a Konica Minolta Digital Camera) shown on a display screen. It will be apparent to those of ordinary skill in the art that the visual indicator could be an icon, an image thumbnail, a text string, a link, or any object displayed on a webpage or a user interface display, or any other pre-determined location on a webpage or a user interface display. This additional information block 1710 is shown again in FIG. 18. Note that in each case, additional information related to the item, the user, the transaction, and a view count is displayed in the additional information block 1710. FIG. 19 illustrates several examples of an additional information block 1810-1814 showing page view counts, and a count of a view of the additional information (e.g. quick details views).

Figure 20:
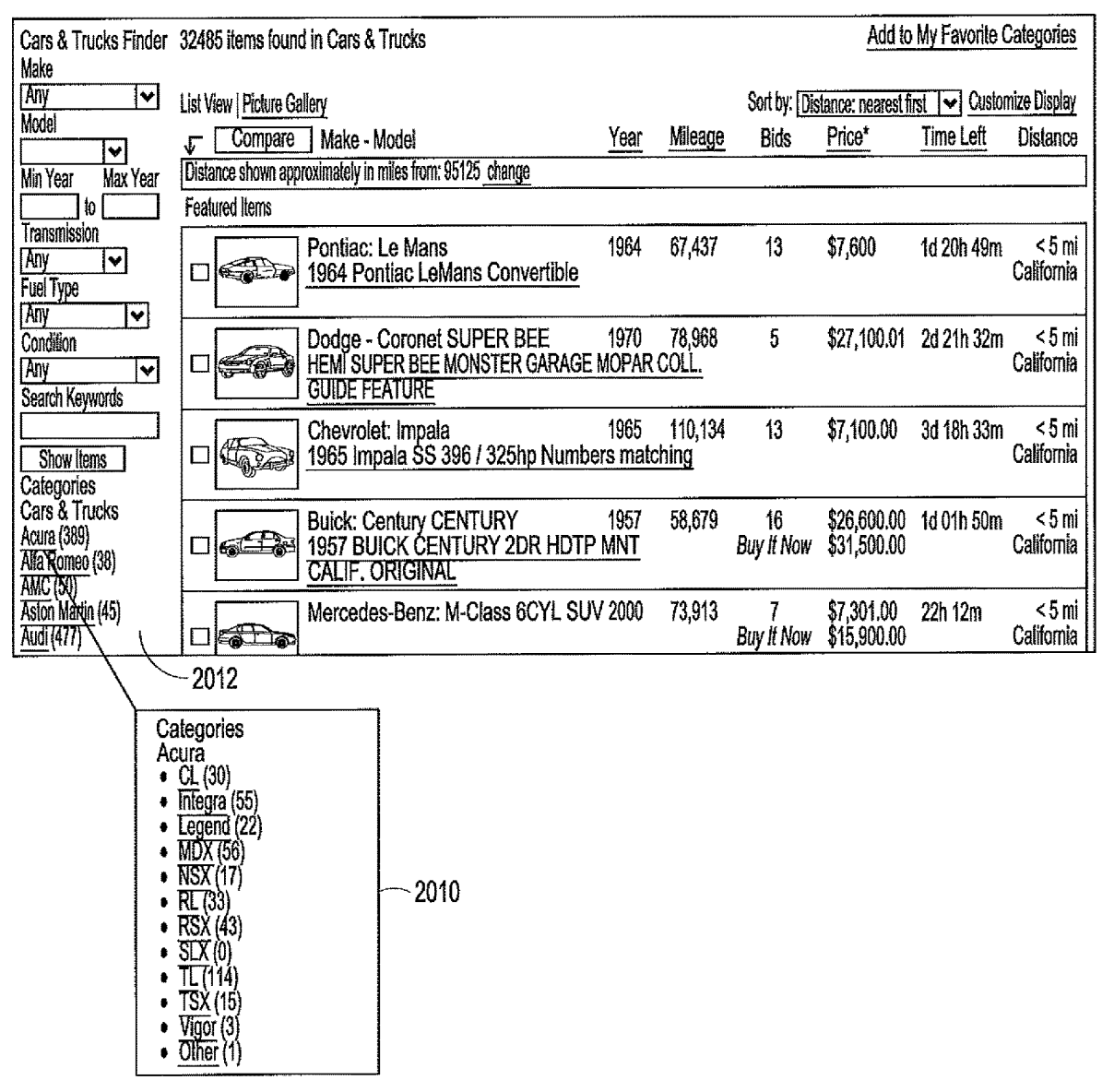
Figure 21:
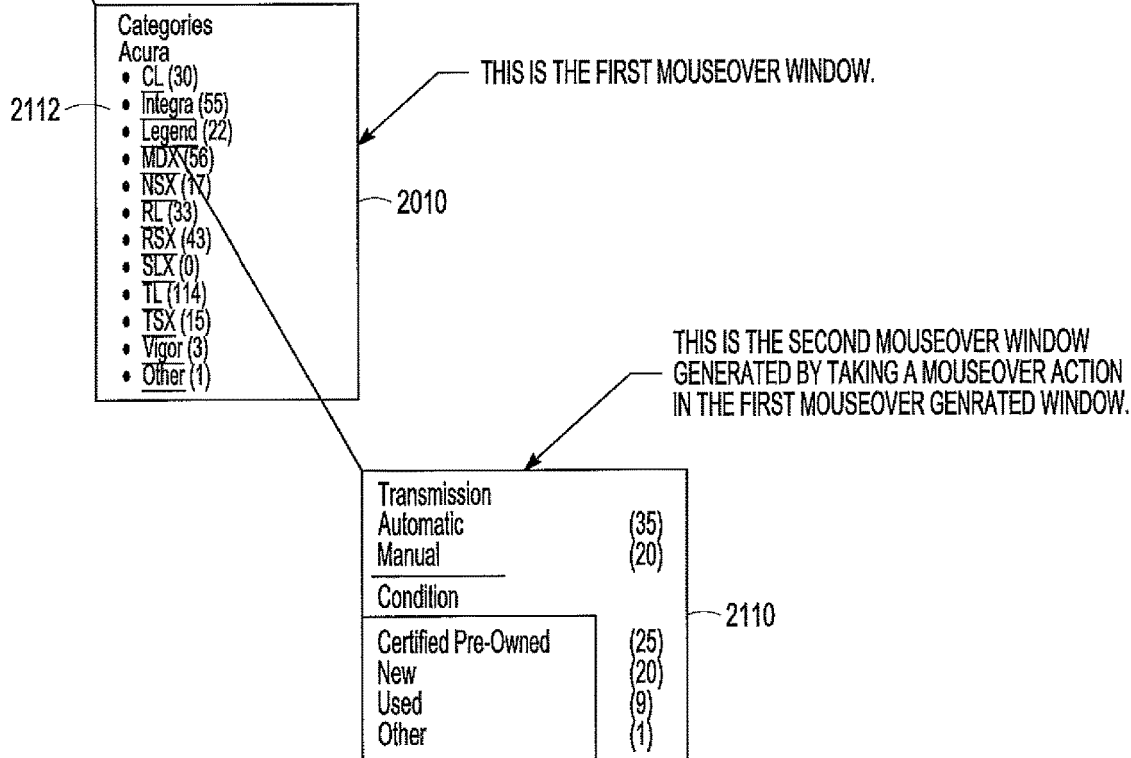

Referring to FIGS. 20-21, another alternative embodiment is illustrated. In this embodiment, a plurality of additional information blocks is shown in response to a plurality of mouseover events. As shown in FIG. 20, a first additional information block 2010 is shown in response to a first mouseover (i.e. a user positioning a pointing device to create a mouseover event) of a first visual indicator 2012 corresponding to an item (e.g. an Acura automobile) in an item list. The additional information displayed in first additional information block 2010 represents detailed information related to the item corresponding to the first mouseover event. In this example, the item corresponding to the first mouseover event represents a category of items (e.g. a category of Acura automobiles). Once the first additional information block 2010 is shown in response to the first mouseover event, the user may mouseover one of the visual indicators displayed in the first additional information block 2010 to generate a second mouseover event. An example of this is shown in FIG. 21. In FIG. 21, the user has performed a second mouseover of a second visual indicator 2112 displayed in the first additional information block 2010, the second visual indicator 2112 corresponding to an item (e.g. an Integra automobile in the Acura category). The second mouseover of the second visual indicator 2112 generates a second mouseover event. As a result of the second mouseover event, a second additional information block 2110 is shown in response to the second mouseover event of the second visual indicator 2112 corresponding to an item (e.g. an Integra automobile in the Acura category) in an item list displayed in the first additional information block 2010. It will be apparent to those of ordinary skill in the art that the same technique can be used to display a plurality of additional information blocks corresponding to a plurality of related mouseover events. In each case, a deeper or more detailed set of additional information can be displayed in additional information blocks as the user performs subsequent mouseover actions. In this manner, various embodiments receive a first mouseover event corresponding to a first visual indicator, generate a first additional information block corresponding to an item represented by the first visual indicator in response to the first mouseover event, receive a second mouseover event corresponding to a second visual indicator displayed in the first additional information block, and generate a second additional information block corresponding to an item represented by the second visual indicator in response to the second mouseover event.

Figure 22:
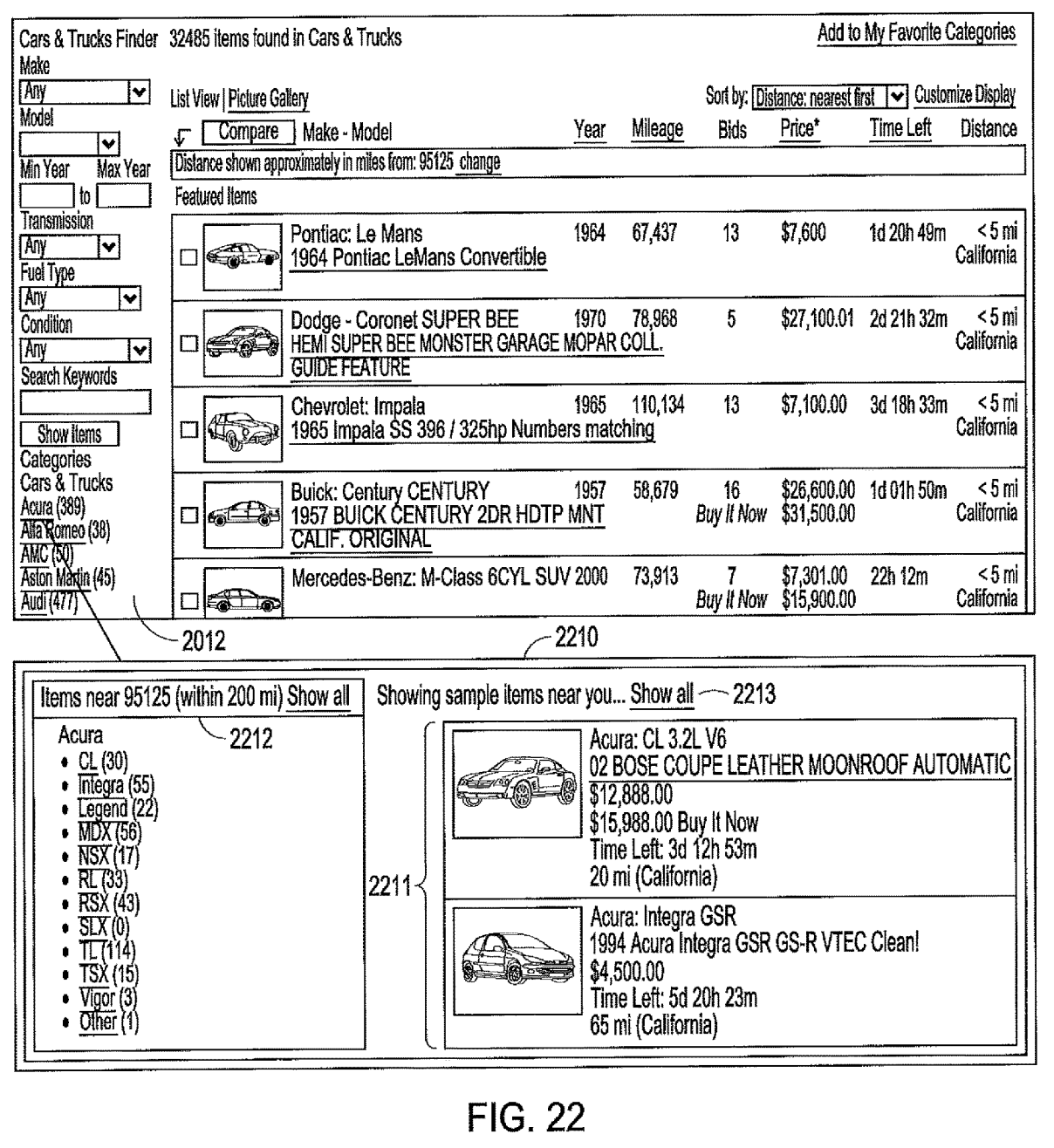

Referring to FIG. 22, another alternative embodiment is illustrated. In this embodiment, an additional information block 2210 is shown in response to a mouseover event (i.e. a user positioning a pointing device to create a mouseover event) of a visual indicator 2012 corresponding to an item (e.g. an Acura automobile) in an item list. As shown in the additional information block 2210, a set of items 2211 is shown as being related to the item represented by the visual indicator 2012 (e.g. various Acura automobiles). In this case, however, the items 2211 shown in the additional information block 2210 have been filtered based on geographical proximity information derived from the user account. In this case, the zip code of the user from the user account information (see item 2212 in FIG. 22) is used to filter the items 2211 displayed in the additional information block 2210 so that only the items 2211 that are most geographically proximate to the user are shown. In this manner, user-specific information is displayed in the additional information block 2210. As described herein, other user-specific information can be used to generate a user-specific additional information block 2210. Also, the additional information block 2210 can show related sample items 2211 having been proximity filtered, while also displaying a link 2213 to expand the list of related items to display more related items from a less proximate location. Note that the user is not required to explicitly indicate that they are interested in running a ZIP code constrained search. Whether this is done for the user or not can be based off of personalization, historical transaction data for this user or other similar users, or a random sample user to evaluate the efficacy of this type of distance limitation in efforts to present relevant items to users and optimize transaction revenue (which in the case of automobiles is highly correlated to a distance from the user ZIP code, which can be assumed or inferred).

Figure 23:
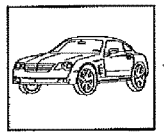

Referring to FIG. 23, another alternative embodiment is illustrated. In this embodiment, a plurality of additional information blocks is shown in response to a plurality of mouseover events. As shown in FIG. 23, a first additional information block 2305 is shown in response to a first mouseover (i.e. a user positioning a pointing device to create a mouseover event) of a first visual indicator 2012 (shown in FIG. 20) corresponding to an item (e.g. an Acura automobile) in an item list. The additional information displayed in first additional information block 2305 represents detailed information related to the item corresponding to the first mouseover event. In this example, the item corresponding to the first mouseover event represents a category of items (e.g. a category of Acura automobiles). Once the first additional information block 2305 is shown in response to the first mouseover event, the user may mouseover one of the visual indicators displayed in the first additional information block 2305 to generate a second mouseover event. An example of this is shown in FIG. 23. In FIG. 23, the user has performed a second mouseover of a second visual indicator 2112 displayed in the first additional information block 2305, the second visual indicator 2112 corresponding to an item (e.g. an Integra automobile in the Acura category). The second mouseover of the second visual indicator 2112 generates a second mouseover event. As a result of the second mouseover event, a second additional information block 2310 is shown in response to the second mouseover event of the second visual indicator 2112 corresponding to an item (e.g. an Integra automobile in the Acura category) in an item list displayed in the first additional information block 2305. It will be apparent to those of ordinary skill in the art that the same technique can be used to display a plurality of additional information blocks corresponding to a plurality of related mouseover events. In each case, a deeper or more detailed set of additional information can be displayed in additional information blocks as the user performs subsequent mouseover actions. In the example of FIG. 23, the items 2311 shown in the second information block 2310 have been filtered based on geographical proximity information derived from the user account. In this case, the zip code of the user from the user account information (see item 2312 in FIG. 23) is used to filter the items 2311 displayed in the second information block 2310 so that only the items 2311 that are most geographically proximate to the user are shown. In this manner, user-specific information is displayed in the second information block 2310. As described herein, other user-specific information can be used to generate a user-specific second information block 2310. Also, the second information block 2310 can show related sample items 2311 having been proximity filtered, while also displaying a link 2313 to expand the list of related items to display more related items from a less proximate location. Note that the user is not required to explicitly indicate that they are interested in running a ZIP code constrained search. In this manner, various embodiments receive a first mouseover event corresponding to a first visual indicator, generate a first additional information block corresponding to an item represented by the first visual indicator in response to the first mouseover event, receive a second mouseover event corresponding to a second visual indicator displayed in the first additional information block, and generate a second additional information block with user-specific information and corresponding to an item represented by the second visual indicator in response to the second mouseover event.

Thus, computer-implemented system and method for displaying additional information corresponding to an item represented by a visual indicator in response to a mouseover event are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:
1. A computing device comprising:
  a display screen; and
  one or more hardware processors configured to:
    display, on the display screen, a page including a visual indicator representative of an item and information corresponding to the item;
    cause a page view count for the page to be incremented in response to the page being displayed on the display screen, the page view count comprising a number of previous page views for the page;
    detect a cursor event corresponding to the visual indicator representative of the item in response to a cursor being positioned within a region associated with the visual indicator representative of the item for a pre-determined length of time;
    in response to the cursor event:
      cause a cursor event count for the item to be incremented, the cursor event count comprising a number of previous cursor events for the item;

determine an access level of a user associated with the cursor event;

responsive to a determination that the access level grants the user access to view additional information corresponding to the item, display, on the display screen, the additional information corresponding to the item, the additional information comprising both the cursor event count for the item and the page view count for the page; and responsive to a determination that the access level restricts the user from viewing the additional information corresponding to the item, display, on the display screen different additional information, wherein the different additional information does not include one or more of the cursor event count for the item or the pale view count for the pale.

2. The computing device of claim 1, wherein the one or more hardware processors are further configured to display, on the display screen, multimedia content associated with the item in response to the cursor event.

3. The computing device of claim 1, wherein the one or more hardware processors are further configured to obtain user profile information for a user, and display, on the display screen, an indication of a relevance between the visual indicator and the user based on the user profile information in response to the cursor event.

4. The computing device of claim 3, wherein the user profile information includes historical, behavioral, or preference information captured over a particular time period.

5. The computing device of claim 4, wherein one or more hardware processors are further configured to display, on the display screen, an advertisement selected based on the user profile information in response to the cursor event.

6. The computing device of claim 5, wherein the displayed page includes a second visual indicator representative of a second item and second information corresponding to the second item, and wherein the one or more hardware processors are further configured to:

detect a second cursor event corresponding to the second visual indicator in response to the cursor being positioned within a second region associated with the second visual indicator representative of the second item; and in response to the second cursor event, display, on the display screen, additional information corresponding to the second item represented by the second visual indicator.

7. The computing device of claim 1, wherein the cursor event is detected in response to the cursor being positioned within the region associated with the visual indicator representative of the item for the pre-determined length of time without a selection of the item.

8. The computing device of claim 1, wherein the different additional information does not include the cursor event count for the item.

9. The computing device of claim 1, wherein the different additional information does not include the page view count for the page.

10. The computing device of claim 1, wherein the different additional information does not include the cursor event count for the item and does not include the page view count for the page.

11. A method comprising:

displaying, on a display screen of a computing device, a page including an image representative of an item offered for sale and information corresponding to the item;

causing a page view count for the page to be incremented in response to the page being displayed on the display screen, the page view count comprising a number of previous page views for the page;

detecting a cursor event corresponding to the image representative of the item in response to a cursor being positioned within a region associated with the image representative of the item for a pre-determined length of time; and in response to the cursor event:

causing a cursor event count for the item to be incremented, the cursor event count comprising a number of previous cursor events for the item;

determining an access level of a user associated with the cursor event;

responsive to a determination that the access level grants the user access to view additional information corresponding to the item, displaying, on the display screen, additional information for the item, the additional information comprising both the cursor event count for the item and the page view count for the page; and responsive to a determination that the access level restricts the user from viewing the additional information corresponding to the item, displaying, on the display screen different additional information, wherein the different additional information does not include one or more of the cursor event count for the item or the pale view count for the pale.

12. The method of claim 11, further comprising obtaining user profile information for a user, and displaying an indication of a relevance between the visual indicator and the user based on the user profile information in response to the cursor event.

13. The method of claim 12, wherein the user profile information includes historical, behavioral, or preference information captured over a particular time period.

14. The method of claim 13, further comprising displaying an advertisement selected based on the user profile information in response to the cursor event.

15. The method of claim 11, wherein the additional information is displayed in an information block along with the image representative of the item offered for sale.

16. The method of claim 11, wherein the additional information further includes a rating of the item offered for sale.

17. The method of claim 11, wherein the different additional information does not include the cursor event count for the item and does not include the page view count for the page.

18. A non-transitory computer-readable storage medium storing program code which, responsive to execution by one or more processors of a computing device, perform operations comprising:

displaying, on a display screen of the computing device, a page including an image representative of an item offered for sale and information corresponding to the item;

causing a page view count for the page to be incremented in response to the page being displayed on the display screen, the page view count comprising a number of previous page views for the page;

detecting a cursor event corresponding to the image representative of the item in response to a cursor being positioned within a region associated with the image representative of the item for a pre-determined length of time; and in response to the cursor event:
  causing a cursor event count for the item to be incremented, the cursor event count comprising a number of previous cursor events for the item;
  determining an access level of a user associated with the cursor event;
  responsive to a determination that the access level grants the user access to view additional information corresponding to the item, displaying, on the display screen, additional information for the item, the additional information comprising both the cursor event count for the item and the page view count for the page; and
  responsive to a determination that the access level restricts the user from viewing the additional information corresponding to the item, displaying, on the display screen different additional information, wherein the different additional information does not include one or more of the cursor event count for the item or the page view count for the page.

19. The non-transitory computer-readable storage medium of claim 18, wherein the operations further comprise obtaining user profile information for a user, and displaying an indication of a relevance between the visual indicator and the user based on the user profile information in response to the cursor event.

20. The non-transitory computer-readable storage medium of claim 19, wherein the user profile information includes historical, behavioral, or preference information captured over a particular time period, and wherein the operations further comprise displaying an advertisement selected based on the user profile information in response to the cursor event.

* * * * *